United States Patent [19]
Heffner

[11] Patent Number: 5,296,913
[45] Date of Patent: Mar. 22, 1994

[54] POLARIMETER RE-CALIBRATION METHOD AND APPARATUS

[75] Inventor: Brian L. Heffner, Redwood City, Calif.

[73] Assignee: Hewlett-Packard Company, Palo Alto, Calif.

[21] Appl. No.: 958,211

[22] Filed: Oct. 8, 1992

[51] Int. Cl.⁵ .................................................. G01J 4/04
[52] U.S. Cl. .................................... 356/364; 356/367
[58] Field of Search ............... 356/364, 365, 366, 367, 356/368, 369, 370; 250/225

[56] References Cited
U.S. PATENT DOCUMENTS 5,011,295  4/1991  Krishnan et al. .................... 374/126

Primary Examiner—Richard A. Rosenberger

[57] ABSTRACT

A method and an apparatus to re-calibrate a polarimeter without a standard source with known polarization. An input electromagnetic wave is sequentially transformed into many electromagnetic waves, all having substantially the same degree of polarization and at least three of the electromagnetic waves having different states of polarization. All the electromagnetic waves are measured by the polarimeter. The method then calculates a calibration factor which, when applied to the measured signals, generates substantially the same calculated degree of polarization for all the electromagnetic waves. A birefringent material, such as a wave-plate, can be used to generate the electromagnetic waves from the input electromagnetic wave. If the input electromagnetic wave is an optical wave, then loops of optical fibers or an electro-optic material, such as a $LiNbO_3$ crystal, is used as the birefringent material.

20 Claims, 6 Drawing Sheets

POLARIMETER RE-CALIBRATION METHOD AND APPARATUS

BACKGROUND OF THE INVENTION

The present invention relates generally to the calibration of a polarimeter and more particularly to a method and an apparatus to re-calibrate a polarimeter without the need for an electromagnetic wave with known polarization.

All polarimeters, which are instruments for measuring the polarizations of electromagnetic waves, have to be calibrated. After calibration, polarimeters drift over time. They have to be regularly re-calibrated especially when they are making accurate measurements. In a typical re-calibration, a polarimeter measures an electromagnetic wave with known polarization generated by a standard source. A relationship is then calculated to adjust the measured signals so that they indicate the polarization of the wave. Unfortunately, any practical standard source drifts over time. Unless the source is tuned back to its correct value, which can be a tedious task, the drifted source leads to erroneous recalibrations.

The standard source not only has to be stable, its wavelength has to be known. After re-calibration, the polarimeter can accurately measure the polarization of a wave with nearly the same wavelength as the standard source. If the wavelength is substantially different than that of the standard source, the accuracy of the measurement is significantly degraded. Thus, to make an accurate polarization measurement, the wavelength of the wave to be measured must be as close as possible to the wavelength of the standard source.

There is a need for a way to re-calibrate a polarimeter with a method that does not depend on a stable standard source. The re-calibrated polarimeter should be able to measure the polarization of waves without the need for knowing their wavelengths accurately. The re-calibration process should be fast and easily accomplished especially when the polarimeter is used for making accurate measurements.

SUMMARY OF THE INVENTION

The present invention provides a method and an apparatus to quickly and easily re-calibrate a polarimeter without a standard source. The re-calibration can be done while the polarimeter is measuring an electromagnetic wave. This re-calibration scheme uses the wave to be measured, instead of a wave with known polarization, to re-calibrate the polarimeter. A polarimeter re-calibrated by this method is able to measure the polarization of a wave without accurately knowing its wavelength because the wave to be measured is itself used to re-calibrate the polarimeter. Moreover, apparatus embodying the invention can be easily integrated into the polarimeter.

Briefly and in general terms, a method of re-calibrating a polarimeter according to the invention includes measuring an input electromagnetic wave with the polarimeter to obtain raw values indicative of the state and degree of polarization of the wave, transforming the wave into another having a different state of polarization but substantially the same degree of polarization, measuring the transformed wave to obtain raw values indicative of its state and degree of polarization, repeating until raw values have been obtained for at least three waves, using the raw values to calculate a calibration factor, and using the calibration factor to re-calibrate the polarimeter.

The calibration factor is calculated such that, when applied to the raw values, it alters the raw values to make them indicate substantially the same degree of polarization for each of the electromagnetic waves. A fitting algorithm or some other suitable technique is used to calculate the calibration factor.

In one preferred embodiment, the input electromagnetic wave is transformed into the plurality of electromagnetic waves by a birefringent material with an adjustable birefringence. The input electromagnetic wave is guided through the birefringent material, which is adjusted to change the state of polarization of the input electromagnetic wave so as to generate the plurality of electromagnetic waves.

In another preferred embodiment that is particularly suited for optical polarimeters, the birefringent material is a plurality of loops of optical fiber serially connected together such that the input optical wave propagates through the loops and couples to the polarimeter. Each loop is rotated through a plurality of positions to change the state of polarization of the input electromagnetic wave so as to generate the plurality of electromagnetic waves.

In other embodiments a wave-plate or an electro-optic material such as a Lithium Niobate ($LiNbO_3$) crystal is used as the birefringent material.

Other aspects and advantages of the present invention will become apparent from the following detailed description, taken in conjunction with the accompanying drawings, illustrating by way of example the principles of the invention.

DESCRIPTION OF THE PREFERRED EMBODIMENT

The present invention provides a method and an apparatus to quickly and easily re-calibrate a polarimeter after the polarimeter has drifted out of calibration. The re-calibration scheme does not need a wave with known polarization; instead, it uses the wave to be measured to re-calibrate the polarimeter. The invention eliminates the need for accurately knowing the wavelength of the wave to be measured, because the wave to be measured is the wave used to re-calibrate the polarimeter. Moreover, the apparatus can be easily integrated into the polarimeter.

Figure 1A:
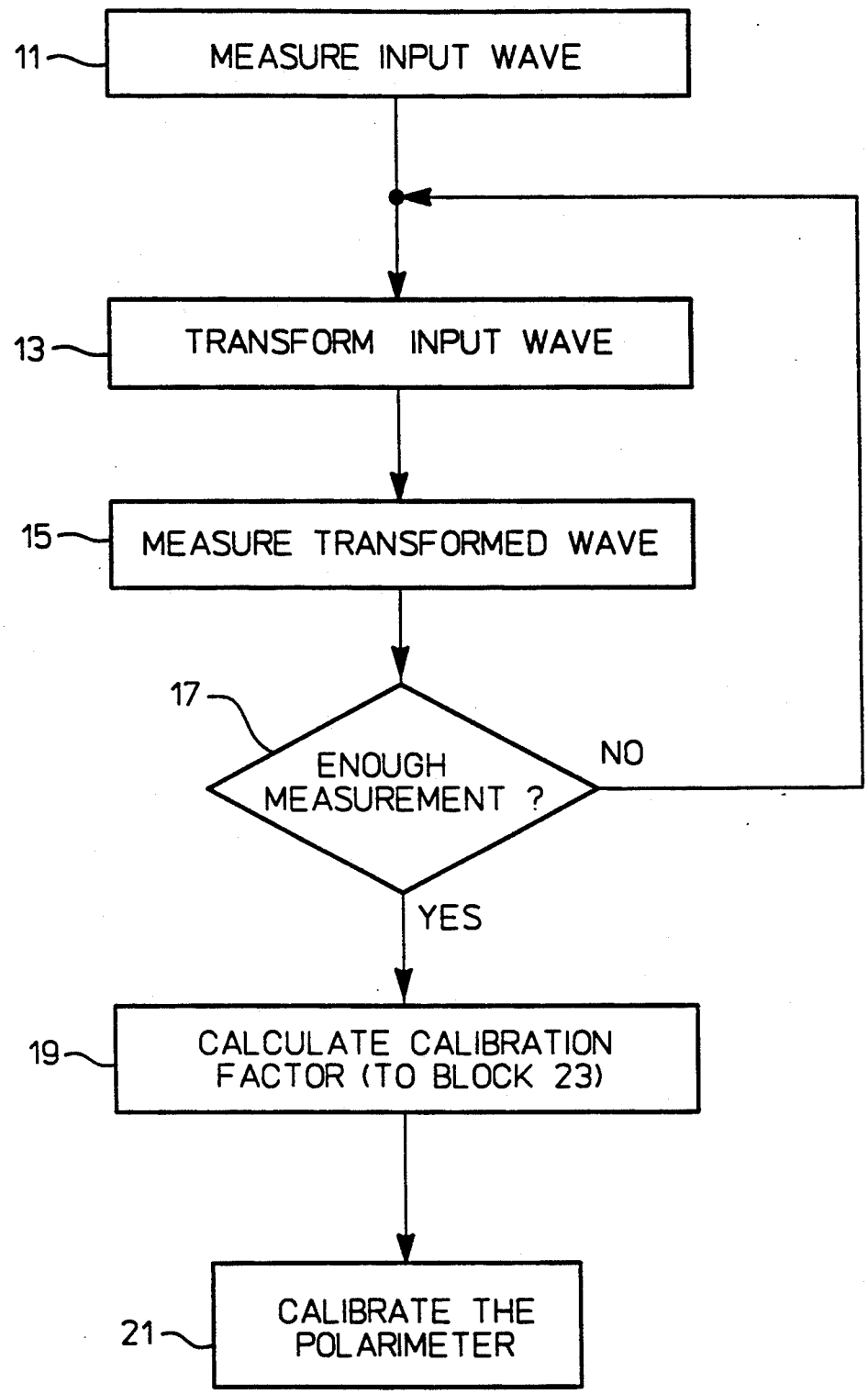
FIG. 1A is a flow chart illustrating a preferred embodiment of a method of calibrating a polarimeter according to the invention.

As shown in the flow chart of FIG. 1A, a method of re-calibrating a polarimeter according to the invention begins with the step of measuring an input electromagnetic wave with the polarimeter to obtain raw values indicative of the state and degree of polarization of the wave (11). Then the input wave is transformed, by means which will be discussed presently, into another electromagnetic wave having a different state of polarization but substantially the same degree of polarization (13). Next the transformed electromagnetic wave is measured with the polarimeter to obtain raw values indicative of the state and degree of polarization of the wave (15). The steps of transforming the wave (13) and measuring the transformed wave (15) are repeated (17) until a desired number of electromagnetic waves, each having a state of polarization differing from that of the others, have been measured. The next step is to calculate a calibration factor that is effective to alter the raw values such that the raw values, after alteration, indicate substantially the same degree of polarization for each of the electromagnetic waves (19). Finally, the calibration factor is used to re-calibrate the polarimeter (21).

Preferably, the steps of transforming the input electromagnetic wave (13) and measuring the transformed wave (15) are performed enough times to yield a total of three sets of measured raw values, each such set corresponding with a wave having a state of polarization that differs from that of each of the other. Of course, it will be apparent that these steps may be performed some other number of times as desired, depending on such matters as desired accuracy and the length of time available to perform the re-calibration procedure.

Figure 1B:
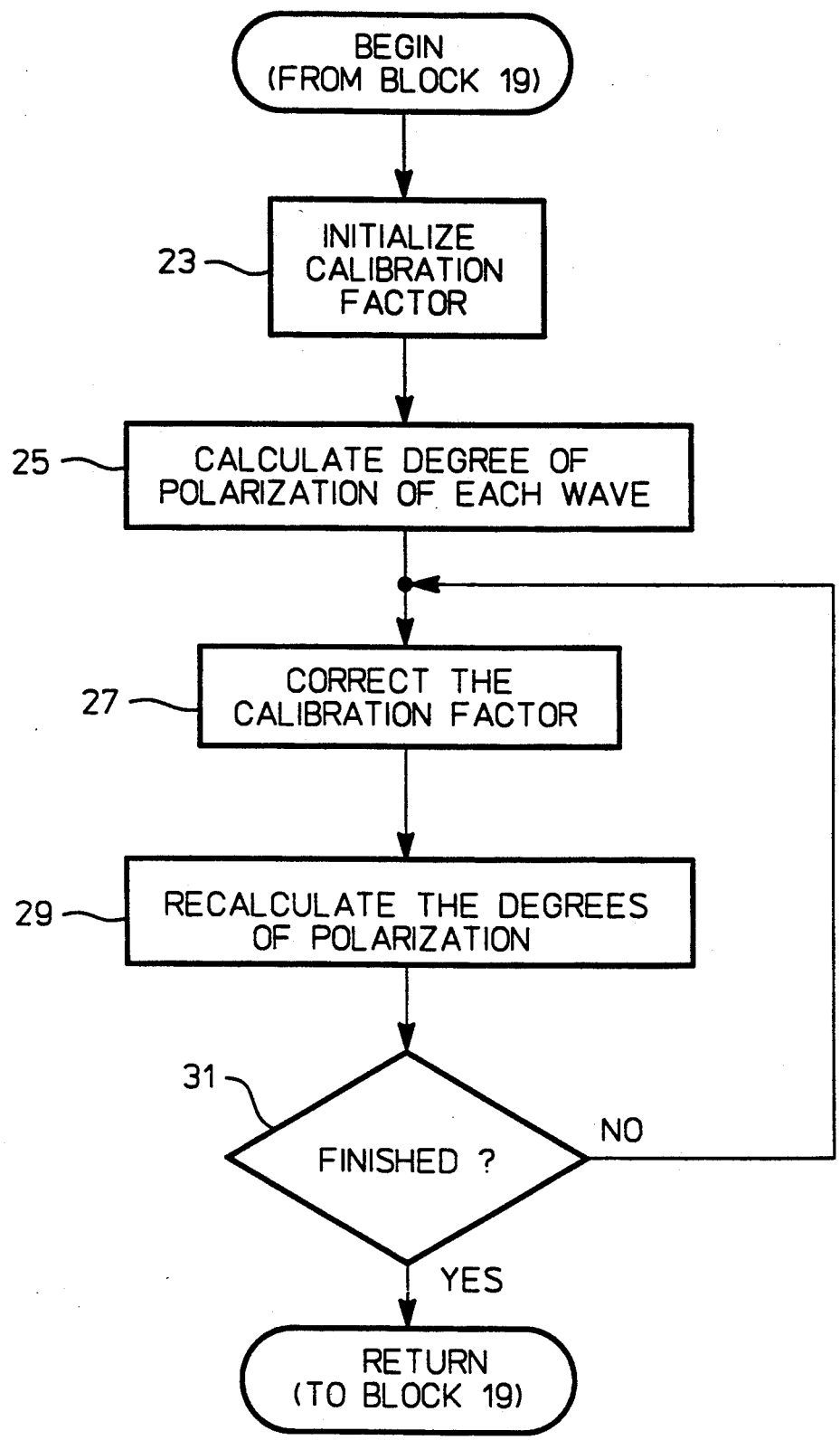
FIG. 1B is a flow chart illustrating a method of calculating a calibration factor as in block 19 of FIG. 1A.

A preferred method of calculating the calibration factor (19) is shown in the flow chart of FIG. 1B. First, the calibration factor is initialized (23). Next the degree of polarization of each measured electromagnetic wave is calculated (25). This calculation includes the initialized calibration factor, the measured raw values of the wave, and a predetermined instrument matrix, all of which will be described in more detail presently. Then the calibration factor is corrected according to the calculated degrees of polarization of the waves (27).

In most instances a single correction of the calibration factor will not be adequate. Instead, the degrees of polarization are recalculated by means of the corrected calibration factor (29) and the calibration factor is again corrected (27), this time according to the recalculated degrees of polarization. This procedure is carried out iteratively (31) until a desired stopping point is reached. For example, in one embodiment the steps of recalculating the degrees of polarization and correcting the calibration factor are repeated until the recalculated degrees of polarization do not differ from each other by more than a predetermined amount. Alternatively, these steps are repeated a predetermined number of times.

The raw values which indicate the state and degree of polarization of each wave are obtained by measuring the wave in the polarimeter. The polarimeter has a plurality of detectors, typically four, each of which generates a signal having a raw value that is proportional to the power incident on that detector. These raw values may be represented as a $1 \times 4$ matrix $[I]$ having elements $I_0$ through $I_3$.

The type of detectors used in any given polarimeter is determined by the type of electromagnetic wave to be measured. If the wave is an optical wave, the detectors typically are photodiodes, photomultiplier tubes or the like. A microwave polarimeter would use microwave detectors instead.

The predetermined instrument matrix is a characteristic of the particular polarimeter being used. For a polarimeter having four detectors, the instrument matrix will have the form of a $4 \times 4$ matrix $[A]$. Typically the values of the elements of the matrix $[A]$ are determined during the original calibration of the polarimeter.

Similarly, the calibration factor takes the form of a $4 \times 4$ calibration matrix $[C]$. $[C]$ is a diagonal matrix having non-zero diagonal elements $C_0$ through $C_3$, where $C_0$ is set equal to 1.

The polarization of an electromagnetic wave is completely represented by means of a Stokes vector $[S]$. This vector has four elements, namely $S_0$ through $S_3$. The Stokes vector for a given wave is provided by the polarimeter by automatically calculating the matrix product of the matrices $[A]$, $[C]$ and $[I]$ according to the following matrix equation:

$$[S] = [A] \times [C] \times [I] \qquad (1)$$

As indicated above, the calibration factor is preferably determined by means of raw values corresponding with three waves having states of polarization that differ from one another. The difference of the states of polarization between two waves is determined by the scalar product of the normalized Stokes vectors of those two waves. The normalized Stokes parameters are defined as $S_1/S_0$, $S_2/S_0$ and $S_3/S_0$; and the elements of the normalized Stokes vectors are the normalized Stokes parameters. The preferred difference between the states of polarization of the waves is obtained when the scalar product of the normalized Stokes vectors is $-0.5$.

The Stokes vector for a given wave, as obtained from equation (1), is used to calculate the degree of polarization DOP of that wave according to the following equation:

$$DOP = \sqrt{\frac{S_1^2 + S_2^2 + S_3^2}{S_0^2}} \qquad (2)$$

The DOP of each wave is compared with that of the other waves. Based on this comparison, a corrected calibration factor is determined and is substituted into equation (1) to obtain new Stokes vectors. From the new Stokes vectors, new DOP values for each wave are computed, and the process is repeated as desired.

Figure 2:
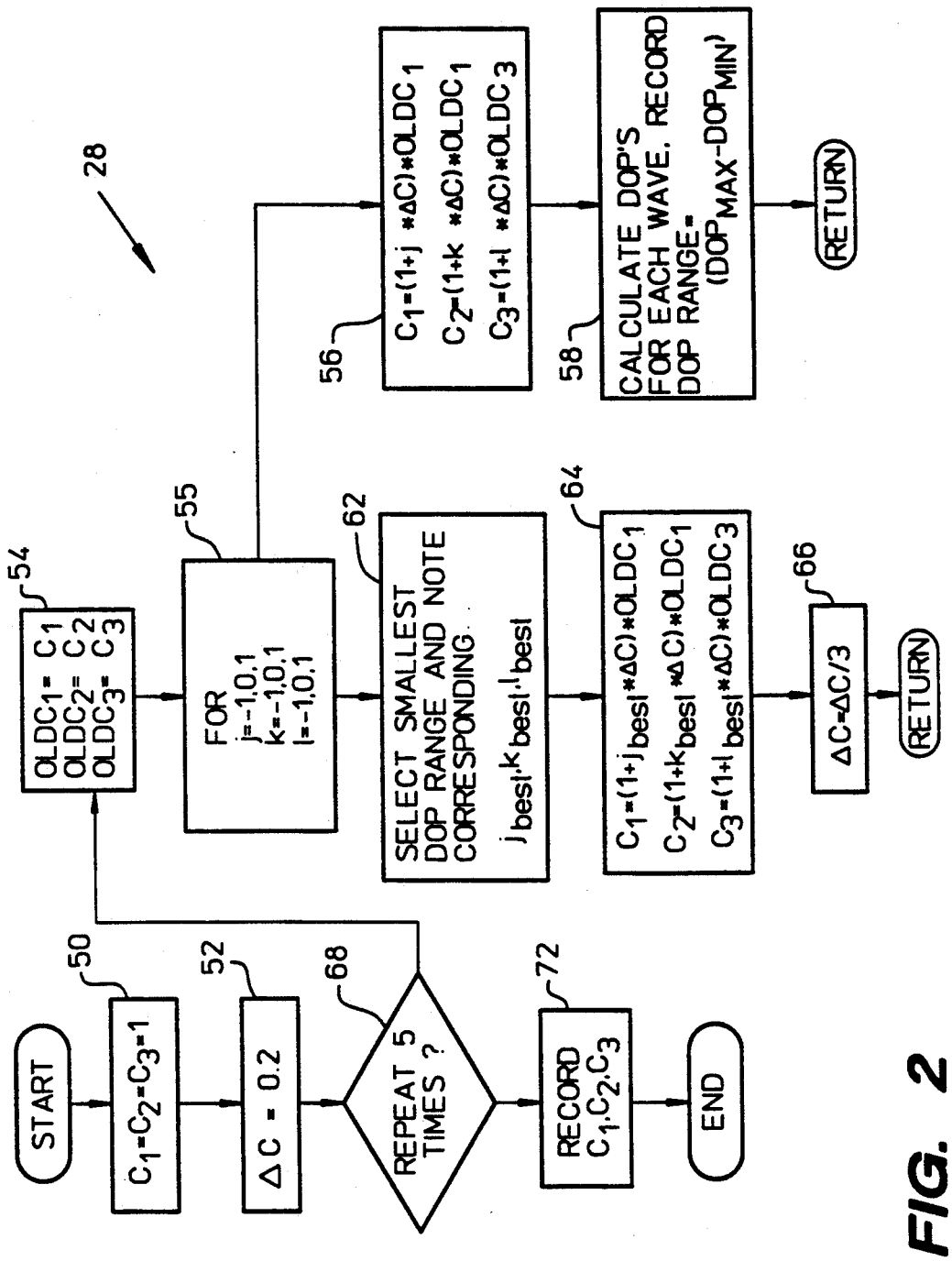
FIG. 2 is a flow chart illustrating in more detail a fitting algorithm for calculating a calibration factor as in block 19 of FIG. 1.

A fitting algorithm that may be used to calculate the corrected calibration factor is illustrated in flow-chart form in FIG. 2. First, the calibration factor $[C]$ is initialized by setting the elements $C_1$ through $C_3$ equal to 1. Then, in an iterative fashion, the calibration values are modified by a fitting algorithm and are used to change the set of parameters until the calculated degrees of polarization of all the electromagnetic waves are substantially the same.

FIG. 2 shows a flow-chart describing in more detail a fitting algorithm to modify the calibration factor (28). Both sets $C_1$-$C_3$ and $OLDC_1$-$OLDC_3$ represent the calibration values. In 50, the calibration values are all initialized to 1; they are stored into variables $OLDC_1$ to $OLDC_3$ (54). Another variable $\Delta C$ is initialized to 0.2 (52). $C_1$-$C_3$ are then modified (56). For this example, with j, k and i each having 3 values, there are altogether 27 different possible calibration factors (55). Each calibration factor is applied to each of the electromagnetic waves to calculate the DOP of the wave. One way to calculate a DOP for a wave is to find its Stokes parameters by equation (1) and solve for its DOP by equation 2. If there are 16 different electromagnetic waves, each calibration factor, after operating onto all the waves, will generate 16 DOP's. The range of all the DOP's for each calibration factor is recorded as the minimum DOP subtracted from the maximum DOP in the 16 DOP's. Solving for the range of DOP's is repeated for another of the 27 calibration factors until all the calibration factors have been exhausted (58). This will generate 27 DOP ranges. The smallest DOP range out of the 27 DOP ranges is selected (62) and its corresponding j, k and l are used to reset the calibration factor (64). The variable $\Delta C$ is reduced to $\frac{1}{2}$ of its former value (66). Steps 54 to 66 are repeated 5 times (68) to generate the final calibration factor (72). This iterative method modifies the calibration factor to change the set of parameters A of the polarimeter until the calculated degree of polarization of all the electromagnetic waves are within a very small range or are substantially the same. Other fitting algorithms that do not need iterations may work as well.

Using the optimized calibration factor, the polarimeter is adjusted (step 32 in FIG. 1) by replacing its instrument matrix A with the matrix (A * C), where C is the calibration matrix from the optimized calibration factor.

After the adjustment, the polarimeter is re-calibrated, and it then indicates substantially the same degree of polarization for the plurality of electromagnetic waves. The type of fitting algorithm or the number of iterations used in solving for the calibration factor affects the accuracy and speed of calibration.

This invention is especially suitable for re-calibrating a polarimeter wherein the responsivities of the detectors drift by different amounts. Even if the responsivity of each detector has drifted by a factor of 10 or more, the invented method can still re-calibrate the polarimeter. The upper limit of the drift in responsivities of the detectors is the noise of the polarimeter.

Although the present invention uses the electromagnetic wave to be measured to re-calibrate the polarimeter, not all wavelengths can be measured by the polarimeter, because the instrument matrix A representing the polarimeter is wavelength dependent. However, the re-calibrated polarimeter is at least ten times less wavelength sensitive than a polarimeter calibrated by a typical method using a known standard source. This means that the re-calibrated polarimeter would be able to accurately measure the polarization of a wave without the need for precisely defining its wavelength if the polarimeter is re-calibrated using the same wave.

One embodiment to transform the input electromagnetic wave to the plurality of electromagnetic waves is by guiding the input electromagnetic wave through a birefringent material. The birefringent material is adjusted to change the state of polarization of the input electromagnetic wave so as to generate the plurality of electromagnetic waves.

Any birefringent material with adjustable birefringence, can be used. A birefringent material is selected according to the accuracy of re-calibration needed. In one embodiment, a birefringent material is selected if two conditions are satisfied: First, the delay between the principal states of polarization of the birefringent material, its differential delay Td, is at least a tenth of the period of the input electromagnetic wave. Second, the change in delay between the principal states of polarization of the material as its birefringence is adjusted, its change in differential delay $\Delta Td$, is substantially less than Tc, the coherence time of the input electromagnetic wave; for example, $\Delta Td < 0.01 * Tc$.

In another embodiment, the birefringent material is selected experimentally using a calibrated polarimeter with known accuracy. In this method, the birefringent material transforms the input electromagnetic wave into the plurality of electromagnetic waves, whose DOP's are measured by the calibrated polarimeter. If all the DOP's are substantially the same, the birefringent material is selected, and the re-calibration accuracy will be similar to the accuracy of the calibrated polarimeter.

The invention will be further clarified by a consideration of the following examples, which are intended to be purely exemplary of the use of the invention.

Figure 3:
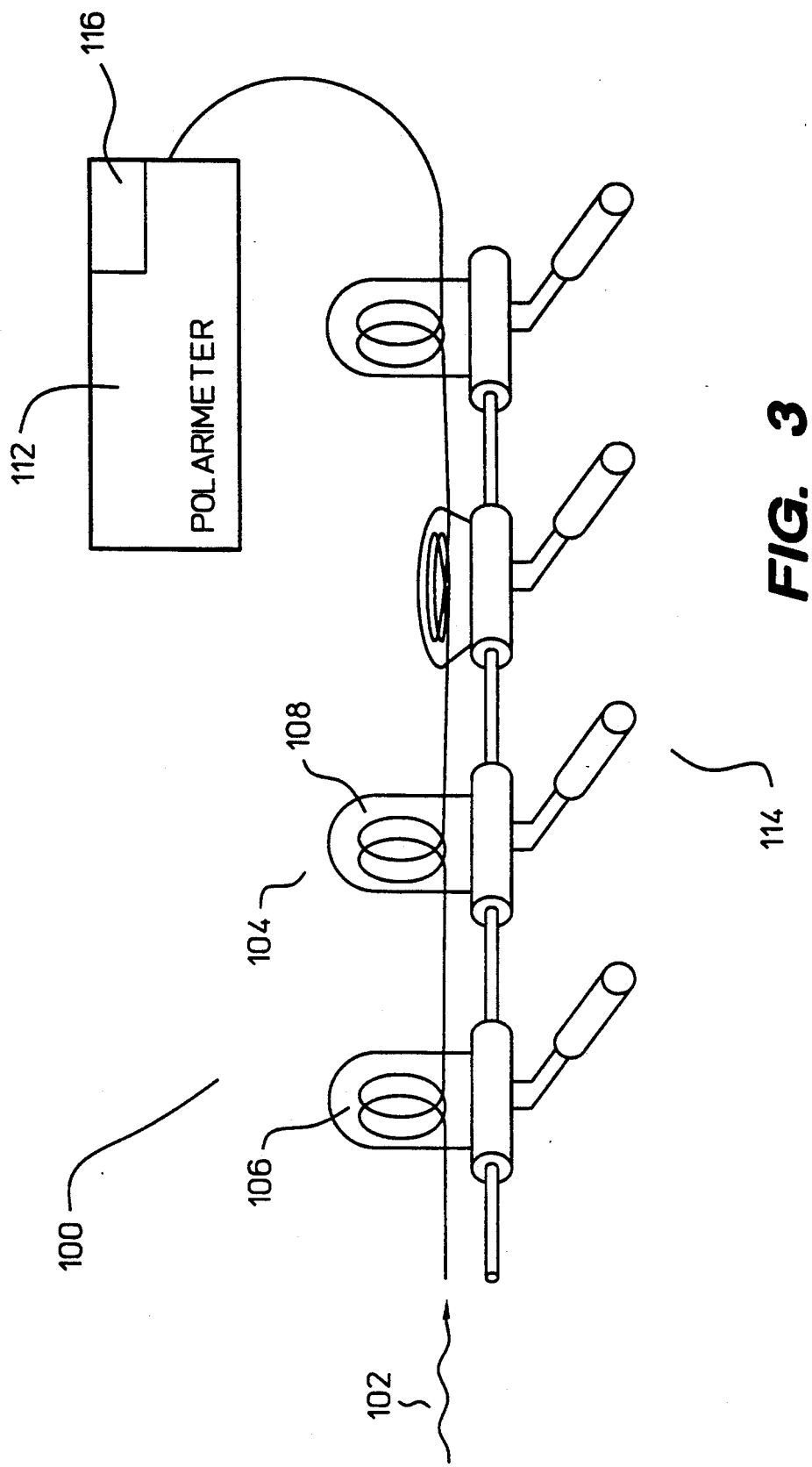
FIG. 3 shows a preferred embodiment of the invented apparatus using loops of optical fiber as the birefringent material.

FIG. 3 shows a preferred embodiment of the invention with loops of optical fiber as the birefringent material. An optical fiber is a mechanical birefringent or stress birefringent material. Under a lateral compression or tension, the fiber takes on the properties of a negative or positive uniaxial crystal. The input electromagnetic wave is an optical wave 102. The birefringent material 104 includes a plurality of sets of loops of optical fiber, each set being serially connected to the other; for example, the set of loops 106 is connected to the set of loops 108. Each set of loops is mounted onto a paddle to secure it mechanically. The loops, receiving the input electromagnetic wave, guides it to the polarimeter 112, which has an embedded computer 116 to perform all the necessary calculations and adjustments for the polarimeter. This type of birefringence transformation method is shown, for example, in "Single-Mode Fibre Fractional Wave Devices and Polarization Controllers" by Lefevre, *Electronics Letters* 25 Sep. 1980, Vol. 16, No. 20, pg. 778–780, the disclosure of which is incorporated by reference.

By changing the orientation of the paddles, the state of polarization of the input electromagnetic wave changes. Each paddle with its set of optical loops is rotated by a solenoid, such as solenoid 114, to a plurality of positions. One preferred rotation scheme is to rotate each set of loops through positions that are about 45° apart. For each set of optical loops to generate a Td of one quarter of the period of the input electromagnetic wave, the radius of the loop is determined by the following equation:

$$R = (8 * \pi * a * r^2 * N)/\lambda$$

where
R = the loop radius;
a = the photoelastic constant of the material of the fiber;
r = the radius of the fiber;
N = the number of loops in each set of loops; and
$\lambda$ = the wavelength of the input electromagnetic wave.

One working embodiment has five sets of loops, with each loop having the following values:
$R \approx 1.5''$;
$a \approx 0.133$ for a commercial grade optical fiber;
$r \approx 62$ microns; and
$N = 4$.

The setup is used to measure an input electromagnetic wave with a wavelength of 1.2 to 1.6 microns and a Tc of at least 1 ps. Each set of loops gives a Td of about 1 to 1.5 fs. As long as the wavelength of the input electromagnetic wave is within the range of ±30 nm from the wavelength of the electromagnetic wave used to find the instrument matrix A, the normalized Stokes parameters of the input electromagnetic wave can be defined to an accuracy of ±0.01.

With five sets of loops, each set being either at a horizontal position or a position 45° from the horizontal position, there are 32 different combinations to generate 32 different electromagnetic waves. The time it takes to accomplish the re-calibration of the polarimeter, which includes the time to flip the paddles through all the 32 orientations, is about 16 seconds. If only 16 orientations of the paddle positions are used, the time can be shortened even further, because practically all the time is spent in flipping the paddles; the computation time is less than 1 second. More than 3 electromagnetic waves are used to ensure that there will be at least three waves with significantly different states of polarization. The loops of optical fiber, with their positions controlled by solenoids, can be easily integrated into the polarimeter, because the loops can be formed with the same fiber which serves as the input path to the polarimeter.

The re-calibration can be done while the polarimeter is in the process of measuring the input electromagnetic wave, because of the following three reasons: The time of re-calibration is very short, the paddles are easily integrated into the polarimeter and the electromagnetic wave used for re-calibration is the electromagnetic wave to be measured. Since the measurement is done immediately after the polarimeter is re-calibrated, without even requiring to switch in the wave to be measured, the polarization of the input electromagnetic wave can be very accurately determined.

Figure 4:
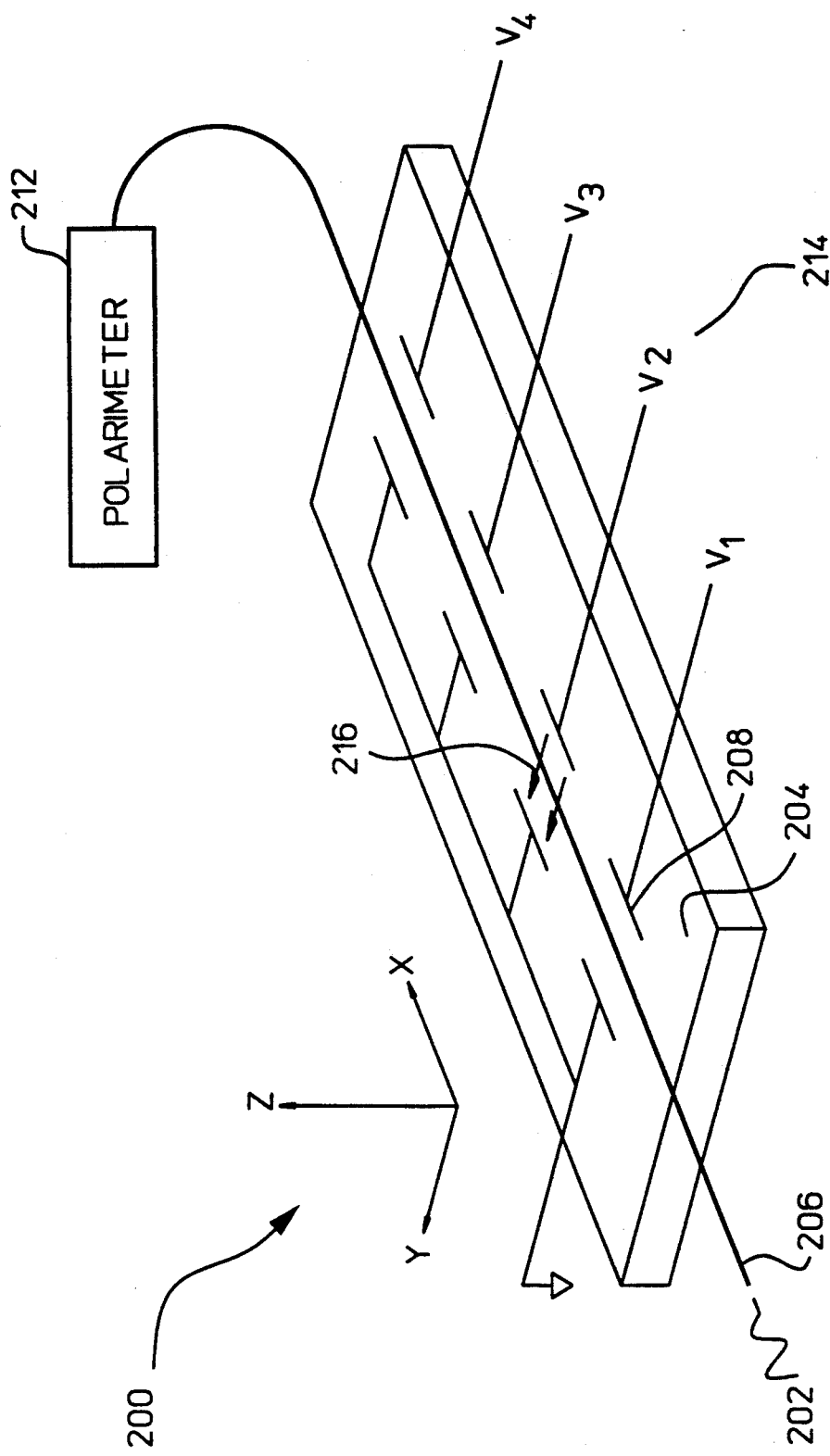
FIG. 4 shows a second preferred embodiment of the invented apparatus with an electro-optic material, such as a $LiNbO_3$ crystal, as the birefringent material.

FIG. 4 shows a preferred embodiment of the invention with an electro-optic material, such as a $LiNbO_3$ crystal, as the birefringent material. The input electromagnetic wave 202 is an optical wave. The birefringence of the $LiNbO_3$ crystal 204 is adjusted by a plurality of electrical signals 214.

The input electromagnetic wave 202 is received by an optical fiber 206 which is coupled to the birefringent material 204 and the electric fields 216 generated by the electrical signals 214. The optical fiber 206 also guides the input electromagnetic wave 202 into the polarimeter 212. Each electrical signal is applied to the input electromagnetic wave through an applicator, for example applicator 208, and is designed to be able to generate a Td of one quarter of the period of the input electromagnetic wave. By changing the voltages on the electrical signals, the state of polarization of the optical wave is adjusted to generate the plurality of electromagnetic waves.

Other means, such as lens systems, can be used for coupling the input electromagnetic wave 202 to the birefringent material 204 and from the birefringent material 204 to the polarimeter 212. Instead of guiding the electromagnetic wave 202 through a fiber 206, a lens system focuses the input electromagnetic wave 202 in free space to the birefringent material 204 and another lens system focuses the electromagnetic wave from the birefringent material 204 to the polarimeter 212.

Figure 5:
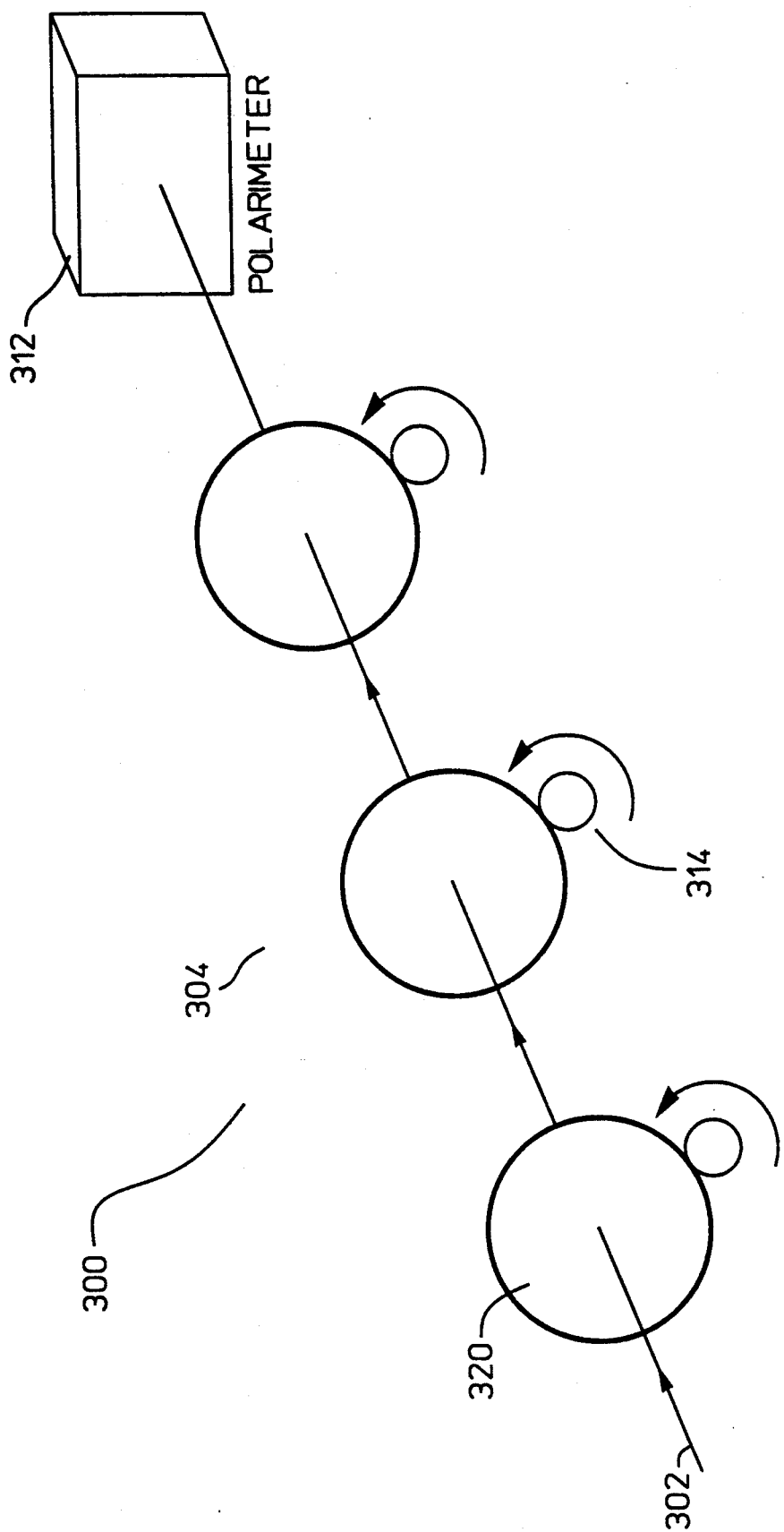
FIG. 5 shows another preferred embodiment of the invented apparatus with wave-plates as the birefringent material.

FIG. 5 shows another preferred embodiment of the invention with wave-plates as the birefringent material. The plurality of wave-plates 304 are rotated by a plurality of motors 320. The wave-plates, as adjusted by the motors 314, changes the state of polarization of an input electromagnetic wave to generate the plurality of electromagnetic waves. Each wave-plate, such as 314, is designed to be able to generate a Td of about one quarter of the period of the input electromagnetic wave. After the input electromagnetic wave 302 passes through the wave-plates 304, it is coupled into the polarimeter 312.

The present invention is a method of re-calibrating a polarimeter easily and quickly and without a standard source. The polarimeter can be re-calibrated while it is in the middle of a measurement. An apparatus based on the method can be easily integrated into the polarimeter. Furthermore, the invented method can be used for any types of electromagnetic waves, including microwave, millimeter-wave, and optical wave.

Other embodiments of the invention will be apparent to the skilled in the art from a consideration of this specification or practice of the invention disclosed herein. It is intended that the specification and examples be considered as exemplary only, with the true scope and spirit of the invention being indicated by the following claims.

I claim:

1. A method of re-calibrating a polarimeter, the method comprising:
    measuring an input electromagnetic wave with the polarimeter to obtain raw values indicative of the state and degree of polarization of the wave;
    transforming the electromagnetic wave into another electromagnetic wave having a different state of polarization but substantially the same degree of polarization after the transformation as before;
    measuring the transformed electromagnetic wave with the polarimeter to obtain raw values indicative of the state and degree of polarization of the wave;
    repeating the preceding two steps until at least three electromagnetic waves, each having a state of polarization differing from that of the other two, have been measured;
    calculating a calibration factor by the steps of:
        a. initializing the calibration factor;
        b. calculating the degree of polarization of each measured electromagnetic wave by means of the initialized calibration factor, the measured raw values of the wave, and a predetermined instrument matrix; and
        c. correcting the calibration factor according to the calculated degrees of polarization of the waves;
    so that the calibration factor is effective to alter the raw values such that the raw values, after alteration, indicate substantially the same degree of polarization for each of the electromagnetic waves; and
    re-calibrating the polarimeter by means of the calibration factor.

2. A method as in claim 1 and further comprising recalculating the degrees of polarization by means of the correct calibration factor and correcting the calibration factor according to the recalculated degrees of polarization of the waves.

3. A method as in claim 2 wherein the steps of recalculating the degrees of polarization and correcting the calibration factor are repeated until the recalculated degrees of polarization do not differ from each other by more than a predetermined amount.

4. A method as in claim 2 wherein the steps of recalculating the degrees of polarization and correcting the calibration factor are repeated a predetermined number of times.

5. A method as in claim 1 wherein the input electromagnetic wave is an optical wave.

6. A method as in claim 1 wherein transforming the input electromagnetic wave comprises:
   selecting a birefringent material;
   guiding the input electromagnetic wave through the birefringent material; and
   adjusting the birefringent material to change the state of polarization of the input electromagnetic wave so as to generate the plurality of electromagnetic waves.

7. A method as in claim 6 wherein the input electromagnetic wave is an optical wave, and transforming the input electromagnetic wave comprises:
   selecting a plurality of sets of loops of optical fiber as the birefringent material, each set being serially connected with another such that the optical wave propagates through all the loops and couples to the polarimeter; and
   rotating each set of loops through a plurality of positions to change the state of polarization of the input electromagnetic wave so as to generate the plurality of electromagnetic waves.

8. A method as in claim 7 wherein transforming the input electromagnetic wave comprises:
   rotating each set of loops through positions that are about 45° apart.

9. A method as in claim 6 wherein the input electromagnetic wave is an optical wave, and transforming the input electromagnetic wave comprises:
   selecting an electro-optic material as the birefringent material;
   applying a plurality of electrical signals which generate electric fields coupled to the electro-optic material; and
   coupling the optical wave to the electro-optic material and the electric fields such that the state of polarization of the optical wave is adjusted by changing the electrical signals to generate the plurality of electromagnetic waves.

10. A method as in claim 6 wherein transforming the input electromagnetic wave comprises:
    selecting a plurality of wave-plates as the birefringent material;
    the electromagnetic wave through the wave-plates into the polarimeter; and
    rotating the wave-plates to change the state of polarization of the input electromagnetic wave to generate the plurality of electromagnetic waves.

11. A method as in claim 6 wherein selecting the birefringent material comprises:
    solving for the differential delay Td of the birefringent material;
    solving for the change in differential delay ΔTd of the birefringent material; and
    selecting the material if Td is at least one tenth of the period of the input electromagnetic wave and if ΔTd is substantially less than Tc, the coherence time of the input electromagnetic wave.

12. A method as in claim 6 wherein selecting the birefringent material comprises:
    selecting a calibrated polarimeter with known accuracy;
    transforming the input electromagnetic wave into the plurality of electromagnetic waves by the birefringent material;
    measuring the DOP's of all the electromagnetic waves by the calibrated polarimeter; and
    selecting the birefringent material if all the DOP's are substantially the same such that the re-calibration accuracy will be similar to the accuracy of the calibrated polarimeter.

13. An apparatus for re-calibrating a polarimeter, the apparatus comprising:
    means coupled to the polarimeter for receiving and transforming an input electromagnetic wave into a plurality of electromagnetic waves, all having substantially the same degree of polarization but at least three of the electromagnetic waves having different states of polarization such that the polarimeter receives the plurality of electromagnetic waves and generates a plurality of measured signals, one measured signal corresponding to the state of polarization of each electromagnetic wave; and
    means coupled to the polarimeter for calculating a calibration factor using the measured signals by the steps of:
    a. initializing the calibration factor;
    b. calculating the degree of polarization of each measured electromagnetic wave by means of the initialized calibration factor, the measured raw values of the wave, and a predetermined instrument matrix; and
    c. correcting the calibration factor according to the calculated degrees of polarization of the waves;
    and for adjusting the polarimeter according to the calibration factor to re-calibrate the polarimeter such that when the polarimeter is re-calibrated, it indicates substantially the same degree of polarization for the plurality of electromagnetic waves.

14. An apparatus as in claim 13 wherein the input electromagnetic wave is an optical wave.

15. An apparatus as in claim 13 wherein the means for receiving and transforming the input electromagnetic wave comprises:
    a birefringent material receiving the electromagnetic wave; and
    means coupled to the birefringent material for adjusting the birefringent material to change the state of polarization of the input electromagnetic wave so as to generate the plurality of electromagnetic waves.

16. An apparatus as in claim 15 wherein:
    the input electromagnetic wave is an optical wave;
    the birefringent material is a plurality of sets of loops of optical fiber, each set being serially connected with another, such that the optical wave propagates through all the loops and couples to the polarimeter; and
    the means for adjusting the birefringent material rotates each set of loops through a plurality of positions to change the state of polarization of the input electromagnetic wave so as to generate the plurality of electromagnetic waves.

17. An apparatus as in claim 16 wherein the means for adjusting the birefringent material rotates each set of loops through positions that are 45° apart.

18. An apparatus as in claim 15 wherein:
    the input electromagnetic wave is an optical wave;
    the birefringent material is an electro-optic material;
    the means for adjusting the birefringent material applies a plurality of electrical signals which generate electric fields coupled to the electro-optic material; and the apparatus comprises:

means for coupling the input electromagnetic wave into the electro-optic material and the electric fields, and means for guiding the electromagnetic wave from the electro-optic material to the polarimeter such that by changing the electrical signals, the state of polarization of the optical wave is adjusted to generate the plurality of electromagnetic waves.

19. An apparatus as in claim 18 wherein:

the means for coupling the input electromagnetic wave into the electro-optic material is an optical fiber; and the means for guiding the input electromagnetic wave from the electro-optic material to the polarimeter is an optical fiber.

20. An apparatus as in claim 15 wherein:

the birefringent material is a plurality of wave-plates; and the means for adjusting the birefringent material rotates the wave-plates such that the wave-plates changes the state of polarization of the input electromagnetic wave to generate the plurality of electromagnetic waves.

* * * * *

UNITED STATES PATENT AND TRADEMARK OFFICE
CERTIFICATE OF CORRECTION

PATENT NO : 5,296,913
DATED : March 22, 1994
INVENTOR(S): Brian L. Heffner

It is certified that error appears in the above-identified patent and that said Letters Patent is hereby corrected as shown below:

Column 8, line 1, "such as 314," should read
-- such as 320 --;

Column 7, line 66, "motors 320" should read
-- motors 314 --;

Column 9, line 47, "the electromagnetic wave" should read
-- guiding the electromagnetic wave --.

Signed and Sealed this

Third Day of November, 1998

*Attest:*

BRUCE LEHMAN

*Attesting Officer*      Commissioner of Patents and Trademarks